United States Patent
Lin et al.

(10) Patent No.: US 11,057,949 B2
(45) Date of Patent: Jul. 6, 2021

(54) METHOD, APPARATUSES AND ARRANGEMENT FOR ESTABLISHING A WIRELESS CONNECTION BETWEEN A VEHICLE AND A VEHICLE ACCESSORY

(71) Applicant: Volvo Truck Corporation, Gothenburg (SE)

(72) Inventors: Ta-Chien Lin, Mölnlycke (SE); Anders Hultstein, Västra Frölunda (SE)

(*) Notice: Subject to any disclaimer, the term of this patent is extended or adjusted under 35 U.S.C. 154(b) by 0 days.

(21) Appl. No.: 16/641,338

(22) PCT Filed: Oct. 3, 2017

(86) PCT No.: PCT/EP2017/075079
§ 371 (c)(1),
(2) Date: Feb. 24, 2020

(87) PCT Pub. No.: WO2019/068314
PCT Pub. Date: Apr. 11, 2019

(65) Prior Publication Data
US 2020/0389927 A1  Dec. 10, 2020

(51) Int. Cl.
*H04W 12/06* (2021.01)
*H04W 76/11* (2018.01)
(Continued)

(52) U.S. Cl.
CPC ............ *H04W 76/11* (2018.02); *H04W 4/40* (2018.02); *H04W 4/70* (2018.02); *H04W 12/50* (2021.01); *H04W 48/16* (2013.01)

(58) Field of Classification Search
CPC ......... H04W 76/11; H04W 4/70; H04W 4/40; H04W 12/50; H04W 48/16; H04W 4/80;
(Continued)

(56) References Cited

U.S. PATENT DOCUMENTS

2006/0068760 A1  3/2006  Hameed et al.
2009/0017755 A1  1/2009  Tomoda
(Continued)

FOREIGN PATENT DOCUMENTS

WO  2008027910 A1  3/2008

OTHER PUBLICATIONS

International Search Report and Written Opinion for International Patent Application No. PCT/EP2017/075079, dated Jun. 18, 2018, 14 pages.
(Continued)

*Primary Examiner* — Dai Phuong
(74) *Attorney, Agent, or Firm* — Withrow & Terranova PLLC

(57) ABSTRACT

The invention relates to a method for establishing a wireless communication channel between a vehicle and a vehicle accessory. The method comprises, in the vehicle: detecting a wired communication channel between the vehicle and the accessory; transmitting a vehicle identifier from the vehicle to the accessory via the wired communication channel; receiving an accessory identifier; deriving a unique code based on the vehicle identifier and the accessory identifier using a predetermined function; broadcasting the unique code by a vehicle wireless transceiver. In the vehicle accessory: deriving the unique code based on the vehicle identifier and the accessory identifier using the same predetermined function as used in the vehicle; receiving the broadcast unique code; determining that the received code corresponds to the determined unique code; finding a network broadcasting the unique code; and establishing a wireless connection between the wireless transceiver of the vehicle and the wireless transceiver of the accessory using the network characterized by the unique code.

15 Claims, 3 Drawing Sheets

(51) Int. Cl.
*H04W 4/70* (2018.01)
*H04W 4/40* (2018.01)
*H04W 48/16* (2009.01)
*H04W 12/50* (2021.01)

(58) Field of Classification Search
CPC .... H04W 12/06; H04W 84/18; H04L 63/061; H04L 63/18; H04L 63/083
See application file for complete search history.

(56) References Cited

U.S. PATENT DOCUMENTS

| | | | |
|---|---|---|---|
| 2015/0149042 A1* | 5/2015 | Cooper | H04W 4/48 701/48 |
| 2018/0009416 A1* | 1/2018 | Maiwand | G07C 9/00571 |
| 2019/0047511 A1* | 2/2019 | Link, II | B60R 25/24 |
| 2019/0135229 A1* | 5/2019 | Ledvina | H04W 4/023 |
| 2020/0258344 A1* | 8/2020 | Brinig | G07F 17/0057 |
| 2021/0067346 A1* | 3/2021 | Hergesheimer | H04L 9/0894 |

OTHER PUBLICATIONS

International Preliminary Report on Patentability for International Patent Application No. PCT/EP2017/075079, dated Sep. 18, 2019, 7 pages.

* cited by examiner

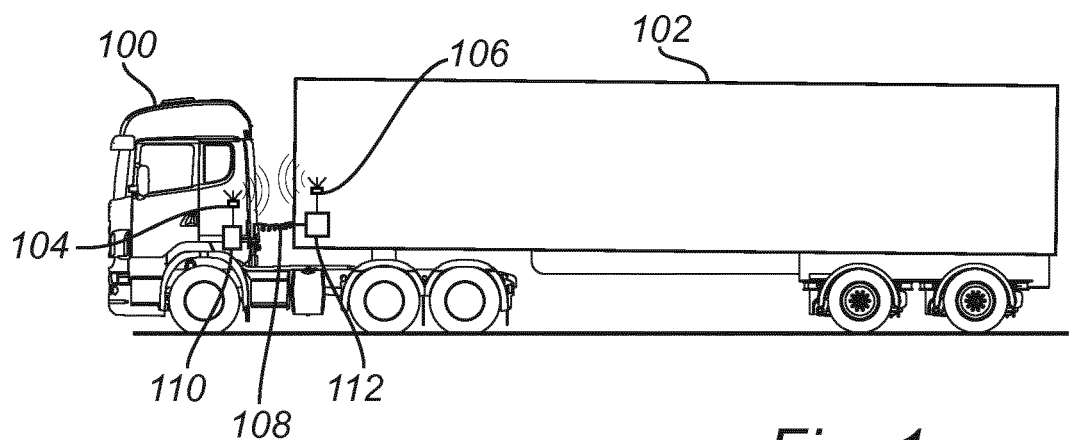
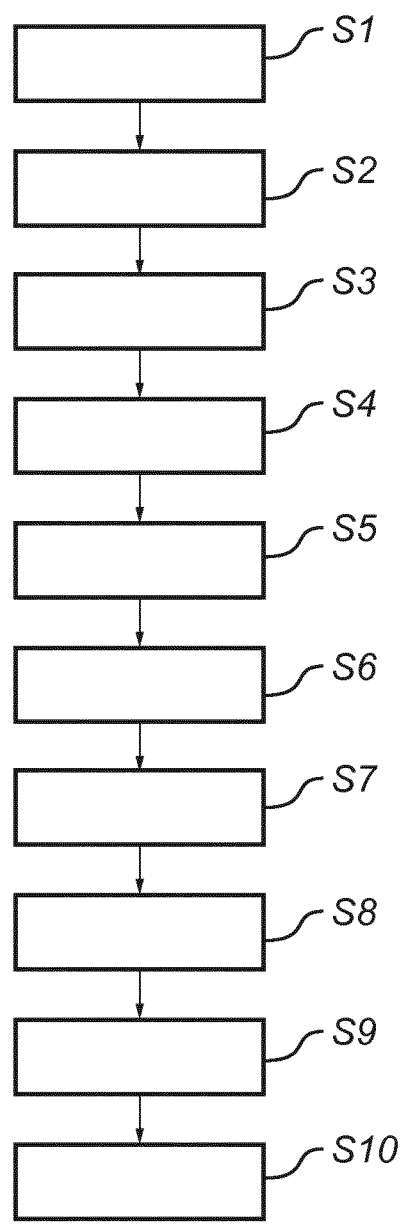

METHOD, APPARATUSES AND ARRANGEMENT FOR ESTABLISHING A WIRELESS CONNECTION BETWEEN A VEHICLE AND A VEHICLE ACCESSORY

This application is a 35 USC 371 national phase filing of International Application No. PCT/EP2017/075079, filed Oct. 3, 2017, the disclosure of which is incorporated herein by reference in its entirety.

The invention relates to a method and a system for forming a wireless connection between a vehicle and a vehicle accessory.

The invention can be applied in vehicles and heavy-duty vehicles, such as trucks, buses and construction equipment. Although the invention will be described with respect to a connection between a truck and a trailer, the invention is not restricted to this particular vehicle and vehicle accessory combination, but may also be used in other types of vehicles, heavy-duty vehicles and working machines which are configured to be used with different types of accessories or implements.

BACKGROUND

A truck or a heavy vehicle is often configured in a modular manner such that it may be used together with a range of different accessories. Moreover, with the increasing implementation of vehicle telematics, there needs to be a communication channel between the vehicle and the accessory. In a scenario where a truck is coupled with an accessory such as a trailer or another similar accessory, a bi-directional communication channel between the truck and the trailer is often established.

As an example, in a vehicle fleet comprising a large number of trucks it is also common that the trucks are connected to trailers from different manufacturers and vendors. Accordingly, the trailer must be able to easily communicate with different types of accessories.

It has long been common practice to form a communication channel between a vehicle and a vehicle accessory using a CAN-bus. However, the communication possibilities over a CAN bus is somewhat limited since communication is performed using standardized messages and since other types of vehicle communication also takes place on the CAN-bus.

With the increasing complexity and functionality of vehicle accessories, it is becoming increasingly important to be able to communicate with the accessory in a convenient manner and to potentially transfer large amounts of data. Accordingly, many accessories are being provided with IoT-functionality such that they can communicate wirelessly with other devices. However securely setting up a wireless communication channel with an IoT device may be require manual steps which have to be performed by the operator of the vehicle.

In view of the above, it is desirable to provide a wireless connection between e.g. a truck and a trailer without having to burden the vehicle operator with additional operations when connecting the accessory to the vehicle.

SUMMARY

An object of the invention is to provide an improved method and system for forming a wireless communications channel between a vehicle and a vehicle accessory.

The object is achieved by a method according to claim 1.

According to a first aspect of the invention, there is provided a method for establishing a wireless communication channel between a vehicle and a vehicle accessory. The vehicle and the vehicle accessory each comprise a wireless transceiver. The method comprises, in the vehicle: detecting a wired communication channel between the vehicle and the accessory; transmitting a vehicle identifier from the vehicle to the accessory via the wired communication channel; receiving an accessory identifier via the wired communication channel; deriving a unique code based on the vehicle identifier and the accessory identifier using a predetermined function; broadcasting the unique code by the vehicle wireless transceiver; in the vehicle accessory: deriving the unique code based on the received vehicle identifier and the accessory identifier using the same predetermined function as used in the vehicle; receiving the broadcast unique code by the accessory wireless transceiver; determining that the received unique code corresponds to the determined unique code; finding a network broadcasting the unique code by the accessory wireless transceiver; and establishing a wireless connection between the wireless transceiver of the vehicle and the wireless transceiver of the accessory using the network characterized by the unique code.

In the present context, the vehicle accessory is typically an accessory which is releasably connectable to the vehicle, or a modular part of a vehicle. Accordingly, the vehicle accessory should not be seen as an integral part of the vehicle as such. In one illustrative example, the vehicle is a truck and the accessory is a trailer to be pulled by the truck. The vehicle accessory may also be a crane mounted on a recycling truck, a tipper or other similar accessories.

The wireless transceiver in both the vehicle and the vehicle accessory may advantageously be provided in the form of a standard WiFi device adhering to IEEE 802.11 standards. The wireless transceiver may for example be a so called internet-of-things (IoT) compatible device capable of employing IP (internet protocol) and web-based IoT-functionalities.

By means of the described method, it is possible to form a wireless network connection between a vehicle and a vehicle accessory in a simple and secure manner which does not require any involvement of the vehicle operator. The operator experiences a plug-and-play solution where the wireless connection is established automatically once the wired connection between the vehicle and the vehicle accessory is established, e.g. once the connector carrying the CAN-bus connection is connected to the accessory. The method is based on the understanding that a wired connection, often in the form of CAN-bus connection, between the vehicle and the accessory is typically already established in the types of applications wherein the described method is intended to be used. The information exchange is based on the concept of a shared secret and private information exchange over an already established communication channel, where some selected secret information is known by both the vehicle and the vehicle accessory. Here, the shared secret is a predetermined function which is configured to give a specific result for a given input. The predetermined function, which may be referred to as a key derivation function, generates a unique code, i.e. a key, which is subsequently used to find the correct network to connect to. The described method allows the accessory to directly connect to the correct network which is particularly advantageous in an environment where a plurality of wireless networks are active and available.

The present invention can be seen to describe a network provisioning process, whereby a network is being prepared and equipped to allow it to provide new services to its users. Herein, the accessory can be seen as a user or a client.

Various embodiments of the described invention are particularly advantageous in applications where it is desirable to control or verify functionality of the accessory from the vehicle. The vehicle may for example be equipped with a control panel in a driver cabin of the vehicle where the features of the accessory can be controlled using the described wireless connection. It is thereby possible for an accessory provider to supply an accessory-specific user interface using such a vehicle control panel, in the form of an app or in the form of specific software. The wireless connection between the accessory and the vehicle also makes it possible to communicate with the accessory using a smartphone, tablet computer or the like. A standalone device may for example be connected to the vehicle by means of Bluetooth or WiFi, where the vehicle in turn supplies the wireless communication channel between the vehicle and the vehicle accessory.

According to one embodiment, the predetermined function may advantageously be a hash function, such as SHA-2 or similar functions. An advantage of using a hash function is that a unique code having a fixed length can be provided regardless of the length of the input. In the described method, the input to the function may be a vehicle identifier and an accessory identifier. However, it cannot be guaranteed that the identifiers will always be of the same length. Moreover, the described method requires that the same input to the function provides the same unique code both in the vehicle and in the vehicle accessory, which is achieved using a predetermined hash function.

According to a further embodiment, establishing a wireless connection may further comprise authenticating the accessory using a shared secret. The above method mainly concerns the steps of finding the correct network for the accessory to connect to. However, it is also desirable to provide the security of an authentication process when connecting the accessory to the network provided by the vehicle.

According to one embodiment, authenticating the accessory may comprise using a shared secret, the shared secret being derived based on the vehicle identifier and the accessory identifier; and wherein the shared secret is different form the code. Accordingly, a hash function may advantageously by used, but a different function from the one used to form the unique code.

According to one embodiment, authentication may also be performed by verifying a certificate of the accessory by means of a root certificate accessible by the vehicle. Hereby, a secure and well established authentication process can be used to ensure that a specific accessory is allowed to connect to and wirelessly communicate with a vehicle. The root certificate may for example be accessible via a cloud connection of the vehicle or it may be locally accessible in the vehicle as a result of a specific vehicle configuration.

According to one embodiment of the invention, the unique code may be broadcast by the vehicle as an information element in a beacon frame. Thereby, established standards for WiFi communication may be used to enable the connection between a vehicle and a vehicle accessory where each comprises a WiFi communication device.

According to one embodiment of the invention the vehicle identifier may be a vehicle identification number, VIN which is a unique vehicle identification number according to ISO 3833.

There is also provided a computer program comprising program code means for performing the steps of any of the above described embodiments when the program is run on a computer.

There is also provided a computer readable medium carrying a computer program comprising program code means for performing the steps of the method of any of the above embodiment when the program product is run on a computer.

The object is also achieved by an arrangement according to claim 13.

According to a second aspect of the invention, there is provided a vehicle arrangement comprising: a vehicle comprising a vehicle wireless transceiver; an accessory comprising an accessory wireless transceiver; a wired communication channel between the vehicle and the accessory; a vehicle control unit configured to: detect the wired communication channel between the vehicle and the accessory; transmit a vehicle identifier from the vehicle to the accessory via the wired communication channel; receive an accessory identifier via the wired communication channel; derive a unique code based on the vehicle identifier and the accessory identifier using a predetermined function; broadcast the unique code; in the vehicle accessory: derive a unique code based on the vehicle identifier and the accessory identifier using the same predetermined function as used in the vehicle; receive the broadcast unique code; determine that the received unique code corresponds to the determined unique code; find the network broadcasting the unique code; and establish a wireless connection between the vehicle and the vehicle accessory using the network characterized by the unique code.

Effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a schematic illustration of a vehicle arrangement according to an embodiment of the invention, FIG. 2 is a flow chart outlining the general steps of a method according to an embodiment of the invention.

DETAILED DESCRIPTION OF EXAMPLE EMBODIMENTS OF THE INVENTION

Figure 3:
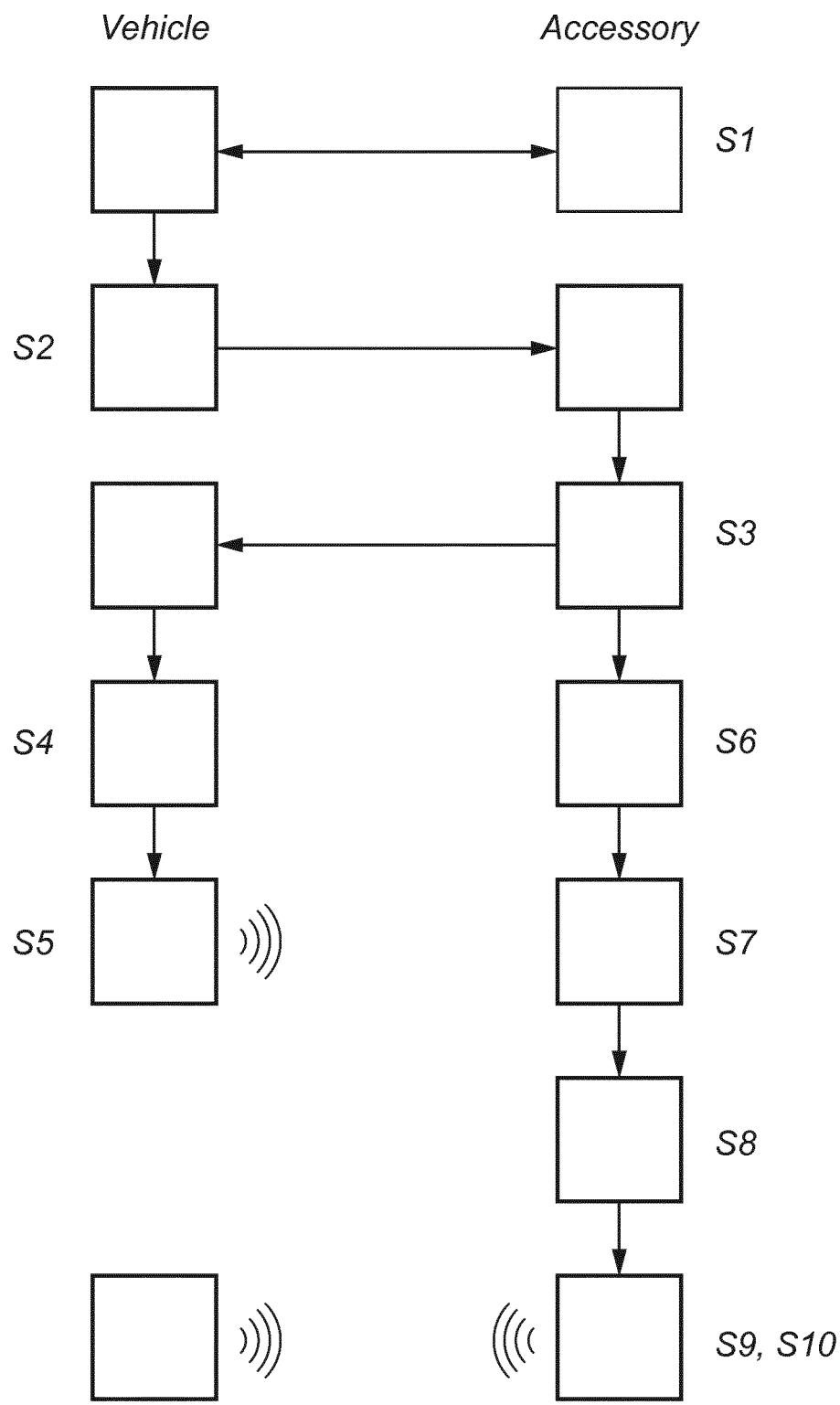
FIG. 3 is a schematic illustration of a vehicle arrangement according to an embodiment of the invention.

In the present detailed description, various embodiments of a method for establishing a wireless connection between a vehicle and a vehicle accessory are mainly discussed with reference to a truck having a trailer connected thereto. It should however be noted that this by no means limits the scope of the present invention which is equally applicable to many different types of vehicles and vehicle accessories.

FIG. 1 illustrates a vehicle arrangement comprising a vehicle 100 in the form of a truck, which comprises a vehicle wireless transceiver 104, and an accessory 102 in the form of a trailer, comprising an accessory wireless transceiver 106. In the following, the term "truck" will be used interchangeably with vehicle, and the term "trailer" be used interchangeably with accessory to illustrate various embodiments of the invention.

The wireless receivers 104, 106, can here be assumed to be WiFi transceivers. There is also a wired communication channel 108 in the form of a CAN-bus connection between the vehicle 100 and the accessory 102. The CAN-bus is operating with standardized messages according to ISO standard ISO11992. Moreover, the CAN-bus has a relatively low bandwidth and is specifically designed for automotive use which may make it unsuitable for use when large amounts of data are transmitted between the vehicle 100 and the accessory 102.

The vehicle 100 further comprises a control unit 110 for controlling the vehicle 100 and in particular for controlling the vehicle wireless transceiver 104 such that the wireless connection 108 with the accessory 102 can be established. In the present context, the vehicle wireless transceiver 104 acts as the access point (truck-side), while the accessory wireless transceiver 108 is the wireless client (accessory side) in a typical access-point-vs-client setup.

The control unit 110 may include a microprocessor, microcontroller, programmable digital signal processor or another programmable device. The control unit 110 may also, or instead, include an application specific integrated circuit, a programmable gate array or programmable array logic, a programmable logic device, or a digital signal processor. Where the control unit 110 includes a programmable device such as the microprocessor, microcontroller or programmable digital signal processor mentioned above, the processor may further include computer executable code that controls operation of the programmable device.

The control unit is connected to the wireless communication device 104 and is configured to control both the wired connection channel 108 and the wireless transceiver 104 to perform the method according to various embodiments of the invention. Moreover, the control 110 unit may be embodied by one or more physical control units, where each control unit may be either a general purpose control unit or a dedicated control unit for performing a specific function.

The accessory 102 comprises a corresponding accessory control unit 112 connected to the accessory wireless transceiver 106 and is configured to handle the communication in the accessory 102.

FIG. 2 is a flow chart outlining the steps of a method according to an embodiment of the invention. The method will be described with further reference to vehicle arrangement illustrated in FIG. 1. The method is also outlined in FIG. 3 schematically illustrating communication between the truck 100 and vehicle 100 and the vehicle accessory 102 during execution of the method.

In a first step, a wired communication channel 108 between the vehicle and the accessory is detected S1. In the case of a truck 100 and a trailer 102, the wired communication channel 108 is typically a CAN-bus connection established by coupling a connector of the truck 100 to a corresponding connector of the trailer 102. Here it is assumed that the vehicle control unit 110 is in charge of the communication both via the wired communication channel 108 and subsequently via the wireless connection. However, the described method is applicable also for other types of wired communication channels.

Once the wired connection 108 is established, a vehicle identifier is transmitted S2 from the truck 100 to the trailer 102 via the wired communication channel 108, where it is received by the trailer 102. The trailer 102, or more specifically a control unit 112 of the trailer 102, transmits an accessory identifier to the truck 100. It should be noted that the specific order of when the vehicle identifier and the accessory identifier is transmitted is not critical for the functionality of the described method. It is thus equally possible to first transmit the accessory identifier to the vehicle 100 followed by transmitting the vehicle identifier to the accessory 102. The vehicle identifier may be any vehicle specific information which uniquely identifies the vehicle 100. The vehicle identifier may for example be the vehicle identification number, VIN, according to ISO standard 3833. In the same way, the accessory identifier may be any accessory specific information element identifying the accessory. Even though it is preferable that the accessory identifier is unique to the accessory, it is not strictly required. The accessory identifier may for example identify the type or model of the accessory.

In the truck 100, and typically in the control unit 110 of the truck 100, a unique code is derived S4 based on the vehicle identifier and the accessory identifier using a predetermined function such as a hash function. It is assumed that the accessory comprises a unique identifier.

The unique code is subsequently broadcast S5 by the vehicle wireless transceiver 104. The code may for example be broadcast as an information element in a beacon frame according to IEEE 802.11 based wireless communication.

In the trailer, 102, preferably in the trailer control unit 112 of the trailer 102, a unique code is derived S6 based on the vehicle identifier and the accessory identifier using the same function as the vehicle such that the same unique code is the resulting output of the function when inputting the vehicle identifier and the accessory identifier.

Next, the broadcast unique code is received S7 by the accessory wireless transceiver 106.

When the unique code has been derived in the trailer 102, it can further be determined S8 that the unique code received by the wireless connection corresponds to the unique code derived in the accessory. If the two codes do not match, the connection attempt may be aborted.

The trailer control unit 112 can then scan for networks broadcasting the unique code, and if a network is found S9 which broadcast the unique code, a wireless connection between the accessory 102 and the truck 100 can be established (S10). In addition to the unique code, the beacon frame transmitted by the vehicle wireless transceiver 104 may include various information elements carrying information related to e.g. network name, channel parameters, security parameters etc. Accordingly if a plurality of networks are found by the trailer control unit 112 the appropriate information element of the network is analyzed to see if the unique code can be found. It should be noted that the specific order of steps is not critical. The accessory wireless transceiver 106 may for example have scanned for available networks and received one or more beacon frames comprising various information elements before deriving the unique code.

Figure 4:
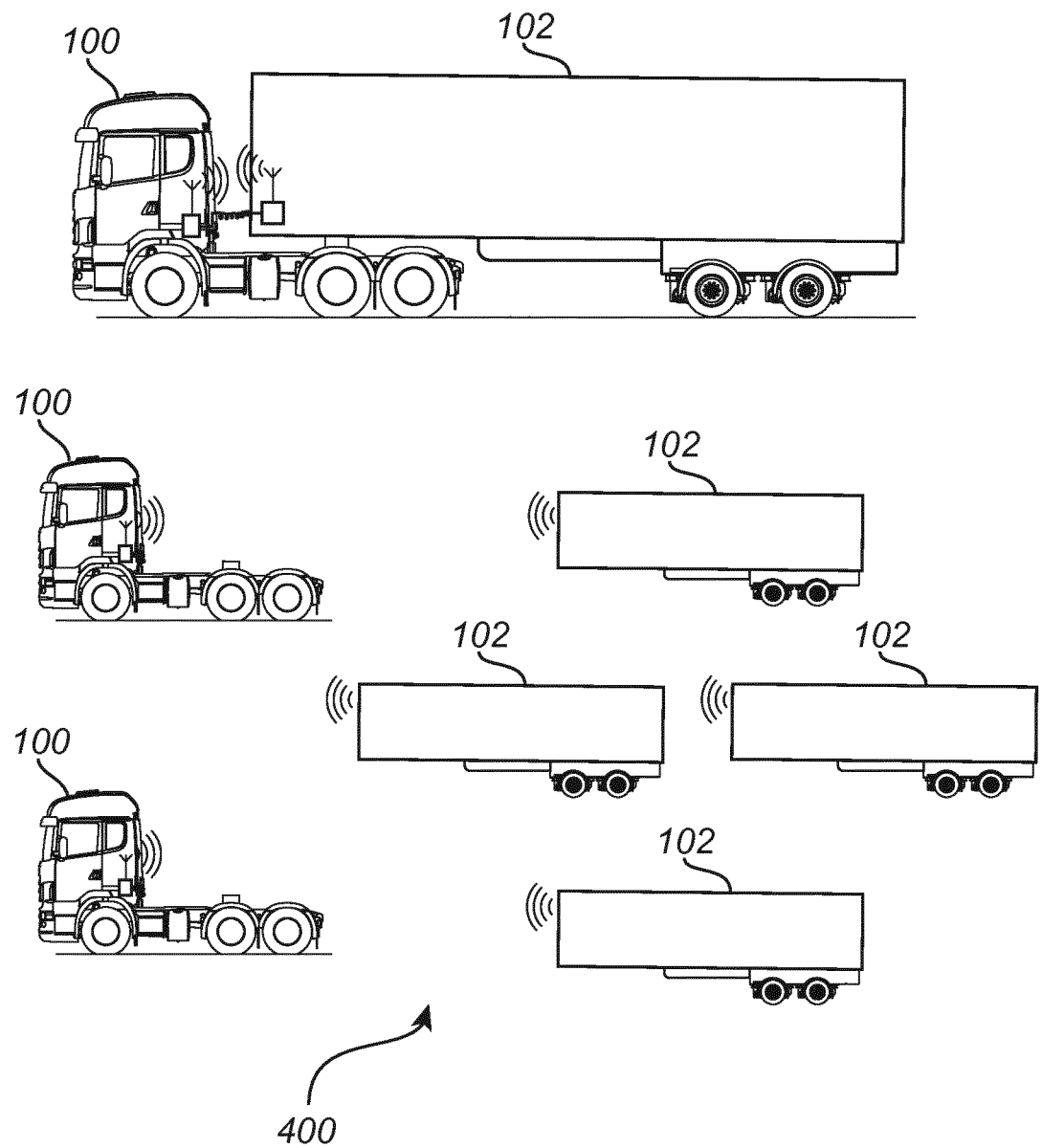
FIG. 4 is a schematic illustration of a vehicle arrangement according to an embodiment of the invention.

FIG. 4 schematically illustrates a situation where embodiments of the described invention advantageously are employed. FIG. 4 illustrates a place like a distribution center where a large number of trucks 100 and trailers 102 are located. If it assumed that each truck 100 has its own network, and there may also be other networks within range, the trailer 102 will have a large number of networks to select from when trying to establish a wireless connection with the correct trailer 100. Thereby, by having exchanged information via an out of band communication channel in the form of the wired connection, the trailer 102 can in a reasonably secure manner determine which network to connect to, thereby both providing a secure and convenient method of connection.

When the correct network has been found and the wireless connection between the truck 100 and the trailer 102 has been formed, it may further be required that the connection is authenticated. Such an authentication may be performed using known authentication methods based on a shared secret or by using certificates where a certificate of the accessory 100 is verified by means of a root certificate available in or accessible by the vehicle 102.

If a shared secret is used to perform authentication, the shared secret may be derived using the vehicle identifier and the accessory identifier for example using a hash function. However, it is preferred that the shared secret used for authentication is different from the unique code used for finding the correct network.

It is to be understood that the present invention is not limited to the embodiments described above and illustrated in the drawings; rather, the skilled person will recognize that many changes and modifications may be made within the scope of the appended claims.

The invention claimed is:

1. A method for establishing a wireless communication channel between a vehicle and a vehicle accessory, the vehicle and the vehicle accessory each comprising a wireless transceiver, the method comprising, in the vehicle:
   detecting a wired communication channel between the vehicle and the accessory;
   transmitting a vehicle identifier from the vehicle to the accessory via the wired communication channel;
   receiving an accessory identifier via the wired communication channel;
   deriving a unique code based on the vehicle identifier and the accessory identifier using a predetermined function;
   broadcasting the unique code by the vehicle wireless transceiver;
   in the vehicle accessory:
   deriving the unique code based on the received vehicle identifier and the accessory identifier using the same predetermined function as used in the vehicle;
   receiving the broadcast unique code by the accessory wireless transceiver;
   determining that the received unique code corresponds to the determined unique code;
   finding a network broadcasting the unique code by the accessory wireless transceiver; and
   establishing a wireless connection between the wireless transceiver of the vehicle and the wireless transceiver of the accessory using the network characterized by the unique code.

2. The method according to claim 1, wherein the predetermined function is a hash function.

3. The method according to claim 1, wherein the wired communication channel is a CAN-bus.

4. The method according to claim 1, wherein establishing a wireless connection further comprises authenticating the accessory using a shared secret.

5. The method according to claim 4, wherein authenticating the accessory comprises using a shared secret, the shared secret being derived based on the vehicle identifier and the accessory identifier; and wherein the shared secret is different from the code.

6. The method according to claim 1, wherein authentication is performed by verifying a certificate of the accessory by means of a root certificate accessible by the vehicle.

7. The method according to claim 1, wherein the wireless transceiver in the vehicle and in the accessory is a WiFi device.

8. The method according to claim 1, wherein the code is broadcast as an information element in a beacon frame.

9. The method according to claim 1, wherein the vehicle identifier is a vehicle identification number, VIN.

10. A vehicle arrangement comprising:
    a vehicle comprising a vehicle wireless transceiver;
    an accessory comprising an accessory wireless transceiver;
    a wired communication channel between the vehicle and the accessory;
    a vehicle control unit configured to:
    detect the wired communication channel between the vehicle and the accessory;
    transmit a vehicle identifier from the vehicle to the accessory via the wired communication channel;
    receive an accessory identifier via the wired communication channel;
    derive a unique code based on the vehicle identifier and the accessory identifier using a predetermined function;
    broadcast the unique code;
    in the vehicle accessory:
    derive a unique code based on the vehicle identifier and the accessory identifier using the same predetermined function as used in the vehicle;
    receive the broadcast unique code;
    determine that the received unique code corresponds to the determined unique code;
    find the network broadcasting the unique code; and
    establish a wireless connection between the vehicle and the vehicle accessory using the network characterized by the unique code.

11. The vehicle arrangement according to claim 10, wherein the vehicle is a truck and the accessory is a trailer.

12. The vehicle arrangement according to claim 10, wherein the wired communication channel is a CAN-bus connection.

13. A computer program comprising program code means for performing the following steps when said program is run on a vehicle control unit of a vehicle and on a corresponding accessory control unit in a vehicle accessory:
    detecting a wired communication channel between the vehicle and the accessory;
    transmitting a vehicle identifier from the vehicle to the accessory via the wired communication channel;
    receiving an accessory identifier via the wired communication channel;
    deriving a unique code based on the vehicle identifier and the accessory identifier using a predetermined function;
    broadcasting the unique code by the vehicle wireless transceiver;
    in the vehicle accessory:
    deriving the unique code based on the received vehicle identifier and the accessory identifier using the same predetermined function as used in the vehicle;
    receiving the broadcast unique code by the accessory wireless transceiver;
    determining that the received unique code corresponds to the determined unique code;
    finding a network broadcasting the unique code by the accessory wireless transceiver; and
    establishing a wireless connection between the wireless transceiver of the vehicle and the wireless transceiver of the accessory using the network characterized by the unique code.

14. The computer program of claim 13 wherein the computer program is carried on a computer readable medium.

15. A vehicle control unit for controlling a vehicle wireless transceiver and an accessory control unit for controlling an accessory wireless transceiver to establish a wireless connection between a vehicle and an accessory, the vehicle control unit and the accessory control unit being configured to perform the following steps:
- detecting a wired communication channel between the vehicle and the accessory;
- transmitting a vehicle identifier from the vehicle to the accessory via the wired communication channel;
- receiving an accessory identifier via the wired communication channel;
- deriving a unique code based on the vehicle identifier and the accessory identifier using a predetermined function;
- broadcasting the unique code by the vehicle wireless transceiver;

in the vehicle accessory:
- deriving the unique code based on the received vehicle identifier and the accessory identifier using the same predetermined function as used in the vehicle;
- receiving the broadcast unique code by the accessory wireless transceiver;
- determining that the received unique code corresponds to the determined unique code;
- finding a network broadcasting the unique code by the accessory wireless transceiver; and
- establishing a wireless connection between the wireless transceiver of the vehicle and the wireless transceiver of the accessory using the network characterized by the unique code.

* * * * *